(12) United States Patent
Croswhite

(10) Patent No.: US 9,346,390 B1
(45) Date of Patent: May 24, 2016

(54) VEHICLE TAILGATE MOUNTED SECUREMENT SYSTEM

(71) Applicant: Roy I. Croswhite, Mica, WA (US)

(72) Inventor: Roy I. Croswhite, Mica, WA (US)

( * ) Notice: Subject to any disclaimer, the term of this patent is extended or adjusted under 35 U.S.C. 154(b) by 0 days.

(21) Appl. No.: 13/788,653

(22) Filed: Mar. 7, 2013

(51) Int. Cl.
*B60P 1/43* (2006.01)

(52) U.S. Cl.
CPC .................................... *B60P 1/43* (2013.01)

(58) Field of Classification Search
CPC .................................. B60P 1/43; B60P 1/435
USPC ..................... 414/480, 537; 296/61; 14/14.1
See application file for complete search history.

(56) References Cited

U.S. PATENT DOCUMENTS

| | | | | |
|---|---|---|---|---|
| 4,084,713 A * | 4/1978 | Rohrs et al. | ............... | 414/537 |
| 5,449,267 A * | 9/1995 | Ablabutyan | ............... | 414/540 |
| 5,971,465 A * | 10/1999 | Ives et al. | ............... | 296/61 |
| 6,186,734 B1 * | 2/2001 | Maurer | ............... | 414/537 |
| 6,250,874 B1 * | 6/2001 | Cross | ............... | 414/537 |
| 6,763,768 B2 * | 7/2004 | Hart et al. | ............... | 105/458 |
| 7,350,843 B2 * | 4/2008 | Meyers et al. | ............... | 296/50 |
| 7,524,156 B2 * | 4/2009 | Garbes | ............... | 414/537 |
| 7,708,294 B2 * | 5/2010 | Demick | ............... | 280/164.1 |
| 7,832,975 B1 * | 11/2010 | Mitchell | ............... | 414/537 |
| 8,061,954 B2 * | 11/2011 | Lambright | ............... | 414/537 |
| 2001/0033787 A1 * | 10/2001 | Eekhoff | ............... | 414/537 |
| 2002/0145300 A1 * | 10/2002 | Webber | ............... | 296/61 |
| 2003/0071476 A1 * | 4/2003 | Schilling | ............... | 296/61 |
| 2004/0118314 A1 * | 6/2004 | Hart et al. | ............... | 104/7.3 |
| 2007/0182192 A1 * | 8/2007 | Meyers et al. | ............... | 296/50 |
| 2007/0183877 A1 * | 8/2007 | Lambright | ............... | 414/469 |
| 2008/0106058 A1 * | 5/2008 | Demick | ............... | 280/164.1 |

\* cited by examiner

*Primary Examiner* — Kaitlin Joerger
(74) *Attorney, Agent, or Firm* — Wells St. John, P.S.

(57) ABSTRACT

This invention discloses a vehicle ramp assembly for secure attachment to a tailgate of a vehicle, which may include a vehicle attachment apparatus with one or more tailgate striker bolts configured attach to and detach from a tailgate latch of the vehicle. This may include a single securement bar attached at opposite ends to the first and second tailgate striker bolts, sized and configured such that the first tailgate striker bolt and the second tailgate striker bolt may be simultaneously attached respectively to the first and second tailgate latches of the vehicle. This invention may further include a ramp configured at a first end to rest on a surface and configured at a second end to be secured to the securement bar.

5 Claims, 13 Drawing Sheets

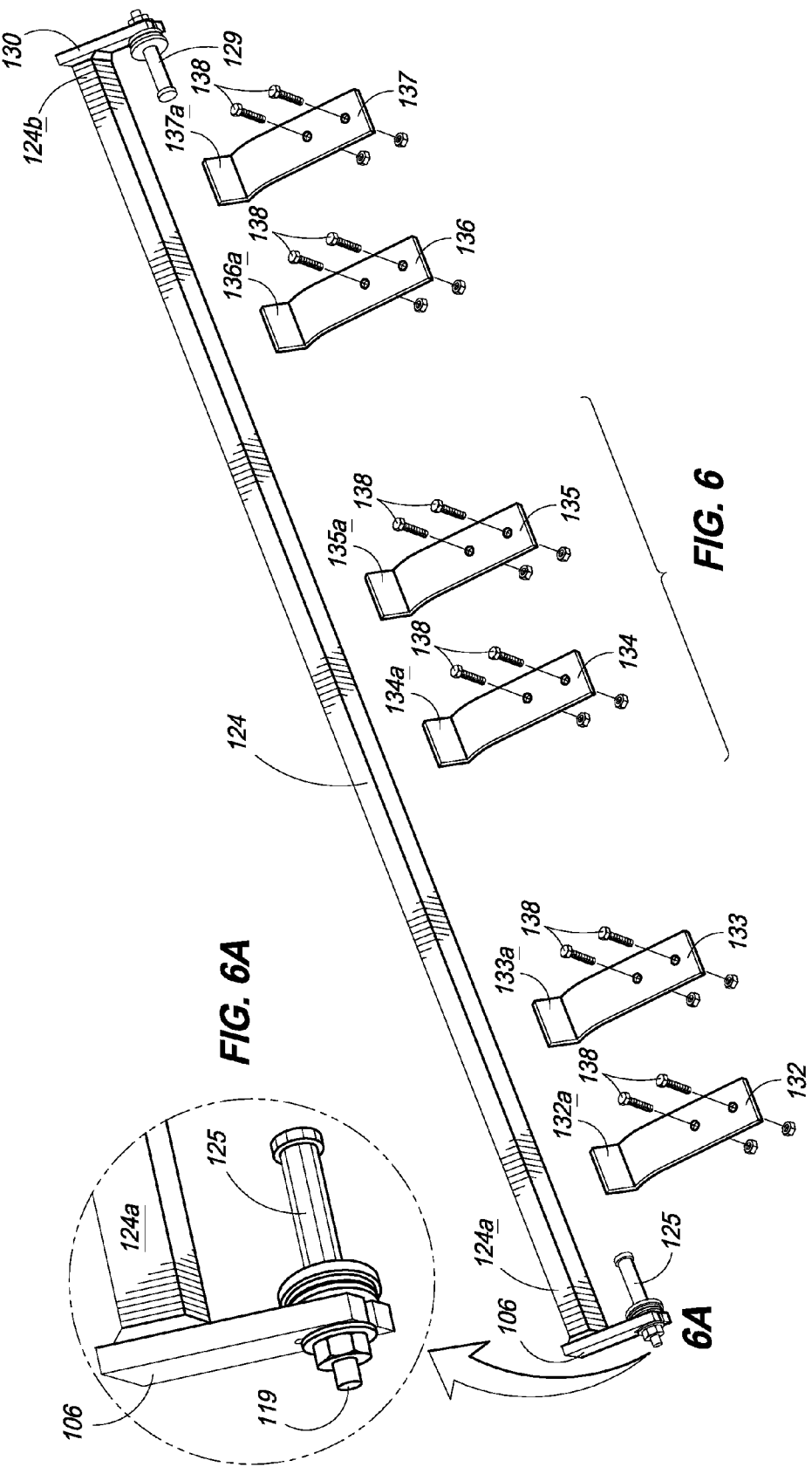

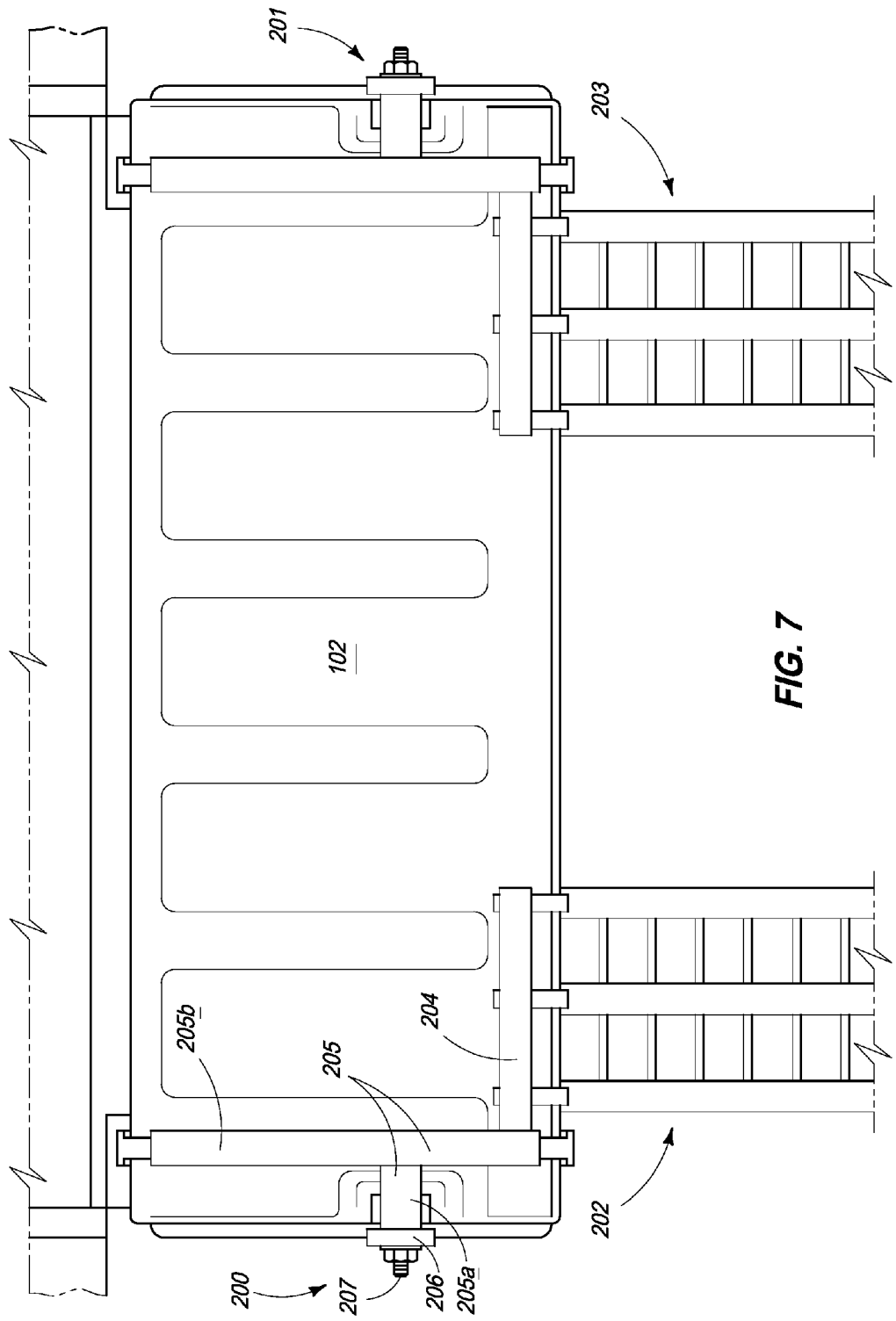

VEHICLE TAILGATE MOUNTED SECUREMENT SYSTEM

CROSS REFERENCE TO RELATED APPLICATION

This application claims priority to the following United States provisional patent application: "A locking bar which holds and keeps ATV ramps from moving or falling off of truck tailgates. This bar locks into the tailgate latches"; filed Mar. 20, 2012, as provisional patent filing No. 61/613,245; inventor Roy Croswhite.

TECHNICAL FIELD

This invention generally relates to a securement device and mounting system for attaching and detaching items such as ATV ramps to the rear portion of what is generally known as a pickup truck or other vehicle with a tailgate. More specifically, this invention discloses such a device which utilizes the existing tailgate latch of the vehicle to attach and secure an item to.

BACKGROUND OF THE INVENTION

For many years people have been utilizing the beds of vehicles such as pickup trucks for countless different uses, both with the tailgate of the truck bed up and also with the tailgate of the truck bed in the down position. One example of this is the loading, transportation and unloading of various vehicles and devices such as All Terrain Vehicles ("ATV'S"), snowmobiles and other devices.

In order to load and unload vehicles such as ATV's and snowmobiles into and out of the vehicle, a ramp, structure or other framework generally bridges the gap between the end of the tailgate in the down position and the ground or other location it is desired to ramp to. In some embodiments, the ramp or structure may be carried in the bed of the truck and slid out when it is desired to use it.

A safety related issue may develop with some of the existing ramp systems and this issue relates to the proper securing of the ramp or structure to the tailgate when a vehicle such as an ATV is being moved up and/or down the ramp. During loading or unloading the ramp can become dislodged or disengaged from its desired or intended location and this exposes the rider and others to safety issues. The typical prior art means of securing the ramps to the tailgates are straps that must be manually attached to the ramp and to a part of the truck such as the bumper or tailgate.

The cumbersome nature of crawling under the tailgate to secure the straps causes many loaders or users to skip that process and try to load or unload without properly securing the ramp(s), hoping and chancing that the ramp or structure will not slip or move to an undesired location during the loading or unloading. The injuries and damages that may regularly occur during this process are obvious.

It is therefore an object of some embodiments of this invention to provide a quicker and easier means to secure ramps, structures and other frameworks to the tailgate of a pickup vehicle.

Furthermore, in situations where the ATV or snowmobile is being unloaded, typically the ramp or structure will typically then be slid back into the bed of the pickup and secured to prevent the theft thereof. This invention may be utilized for example for loading ATV's, lawn mowers, and golf carts as a few examples of applications.

In some embodiments of this invention it is an object to provide an attachment apparatus that can be secured and locked into place when the user of the vehicle is not present. Some embodiments of this invention provide for the attachment and locking of the invention to locking tailgate latches which are present for example in newer pickup models. This for example allows for the locking of the vehicle and locking of the tailgate latch with invention locked therein so that the ramp may be left in the down position until the user returns to the truck to reload the vehicle up the ramps without having to slide them back out of a secure position within the truck and remount the ramp or structure for loading. The locking of the tailgate latch via the vehicle may therefore lock the invention to the vehicle via the tailgate locking mechanism of the vehicle.

It is also an objective of some embodiments of this invention to provide a securement mechanism which only safely attaches and detaches to the existing pickup without modification or destructive changes to the pickup (such as bolt holes and other modifications to the vehicle). Some embodiments of this invention accomplish this by providing components which lockably attach and detach to and within the existing latches in the tailgate of pickup trucks.

In other embodiments of this invention, a securement mechanism may be provided to attach other items to the tailgate of a truck and which lock and secure them into place. For example for those who tailgate and use barbecues at sports events, embodiments of this invention may be securely attached to barbecues and other equipment being used, and locked securely while the user goes into the sporting event by simply using the existing latching and locking mechanisms provided with the truck.

While the invention was motivated in addressing some objectives, it is in no way so limited. The invention is only limited by the accompanying claims as literally worded, without interpretative or other limiting reference to the specification, and in accordance with the doctrine of equivalents. Other objects, features, and advantages of this invention will appear from the specification, claims, and accompanying drawings which form a part hereof. In carrying out the objects of this invention, it is to be understood that its essential features are susceptible to change in design and structural arrangement, with only one practical and preferred embodiment being illustrated in the accompanying drawings, as required.

BRIEF DESCRIPTION OF THE DRAWINGS

Preferred embodiments of the invention are described below with reference to the following accompanying drawings.

FIG. 6 is a perspective top view of an embodiment of this invention and illustrating potential attachment strips which may be utilized to attach a ramp or other device to the securement bar of this example of this embodiment of the invention;

FIG. 6A is a detail view of a portion of the example of the embodiment illustrated in FIG. 6;

FIG. 7 is a top view of a portion of an example of an embodiment of this invention wherein the two points of attachment are independent;

DETAILED DESCRIPTION OF THE PREFERRED EMBODIMENTS

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an" and "the" as used in the claims herein are used in conformance with long-standing claim drafting practice and not in a limiting way. Unless specifically set forth herein, the terms "a", "an" and "the" are not limited to one of such elements, but instead mean "at least one".

Examples of some embodiments of this invention may be utilized for ramping and other attachments to be attached and detachable to a vehicle. These vehicles may include, without limitation, vehicles which are typically referred to as pickup trucks, flatbed trucks, cars with a pickup like truck bed, and tow trucks, all within the contemplation of embodiments of this invention.

Figure 1:
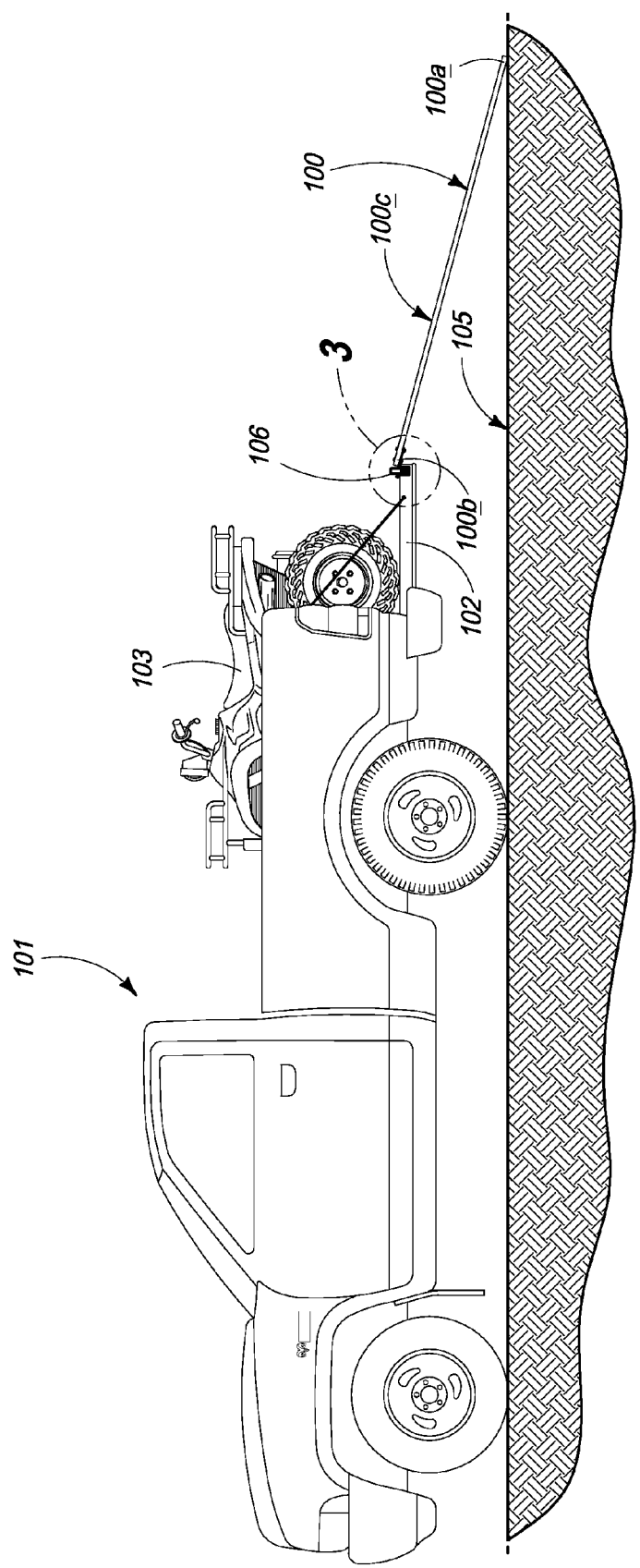
FIG. 1 is an elevation view of a pickup truck with its tailgate down and illustrating one example of an embodiment of this invention utilized to attach an ATV ramp to the tailgate of the pickup truck.

FIG. 1 is an elevation view of a pickup truck 101 with its tailgate 102 in the down position, and illustrates one example of an embodiment of this invention utilized to attach a ramp 100 to the tailgate 102 of the pickup truck 101. The ramp 100 is suitable for the use of loading and unloading an ATV in this example.

FIG. 1 shows ATV 103 within the bed of pickup 101, it having driven up the top surface 100c of ramp 100 and across tailgate 102, and thereafter into the bed of the pickup 101. The ramp 100 forms a bridge and incline between the vertical level of the tailgate 102 and the ground 105, with first end 100a of ramp 100 interacting with the ground and second end 100b of the ramp 100 being attached to tailgate 102 through an embodiment of this invention. Item 106 depicts a lockbar or securement bar structure as it may be used in some embodiments of this invention which secures the ramp 100 to the tailgate 102 of the vehicle or pickup truck 101.

Figure 2:
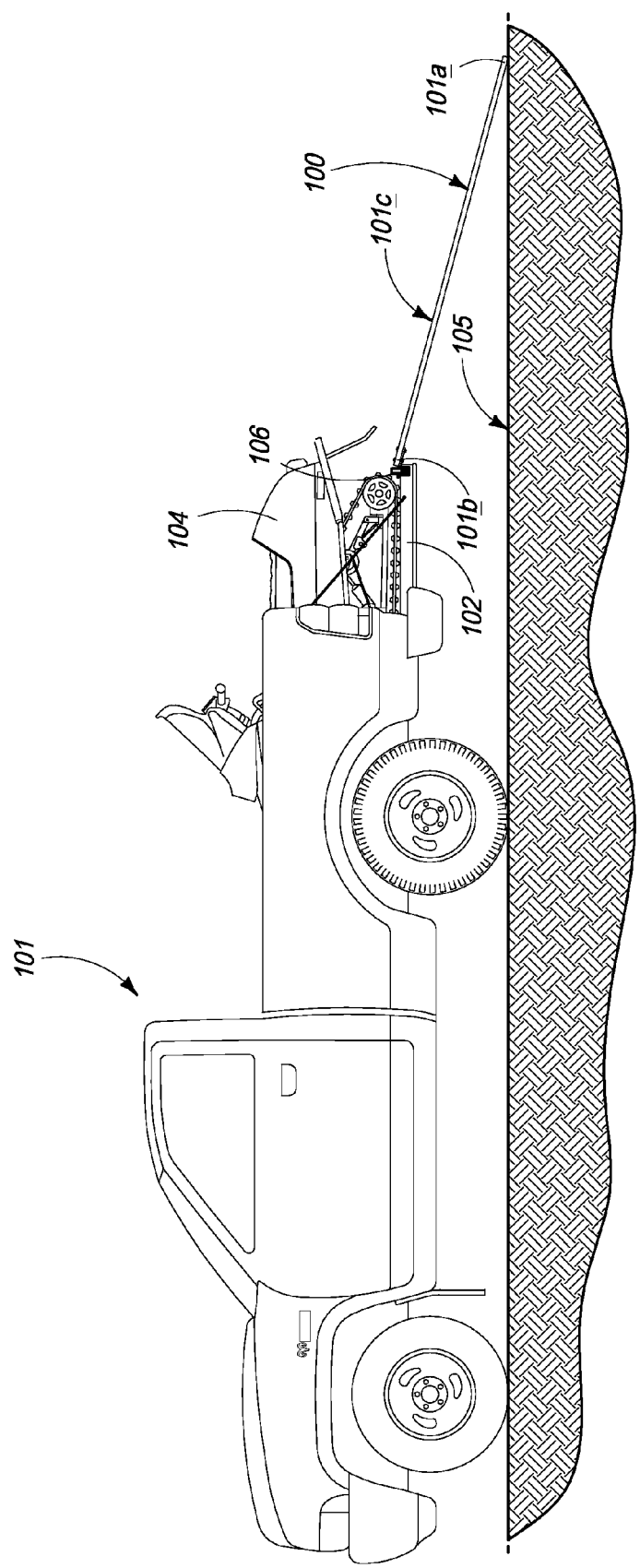
FIG. 2 is an elevation view of a pickup truck with its tailgate down and illustrating one example of an embodiment of this invention utilized to attach a snowmobile ramp to the tailgate of the pickup truck.

FIG. 2 is an elevation view of the vehicle or pickup truck 101 with its tailgate 102 down and illustrating one example of an embodiment of this invention utilized to attach a ramp to the tailgate 102 of the pickup truck 101 to allow the snowmobile 104 to be driven up or down the ramp for loading and unloading to and from the pickup bed and ground 105. Item 106 a lockbar or securement bar structure as it may be used in some embodiments of this invention, which is shown and described more fully below. The ramp 100 in FIG. 2 is suitable (or also suitable) for the use of loading and unloading a snowmobile in this example. All items shown in FIG. 2 are like or similar items to those shown and described relative to FIG. 1, and will not therefore be discussed in detail here to avoid repetition.

Figure 3:
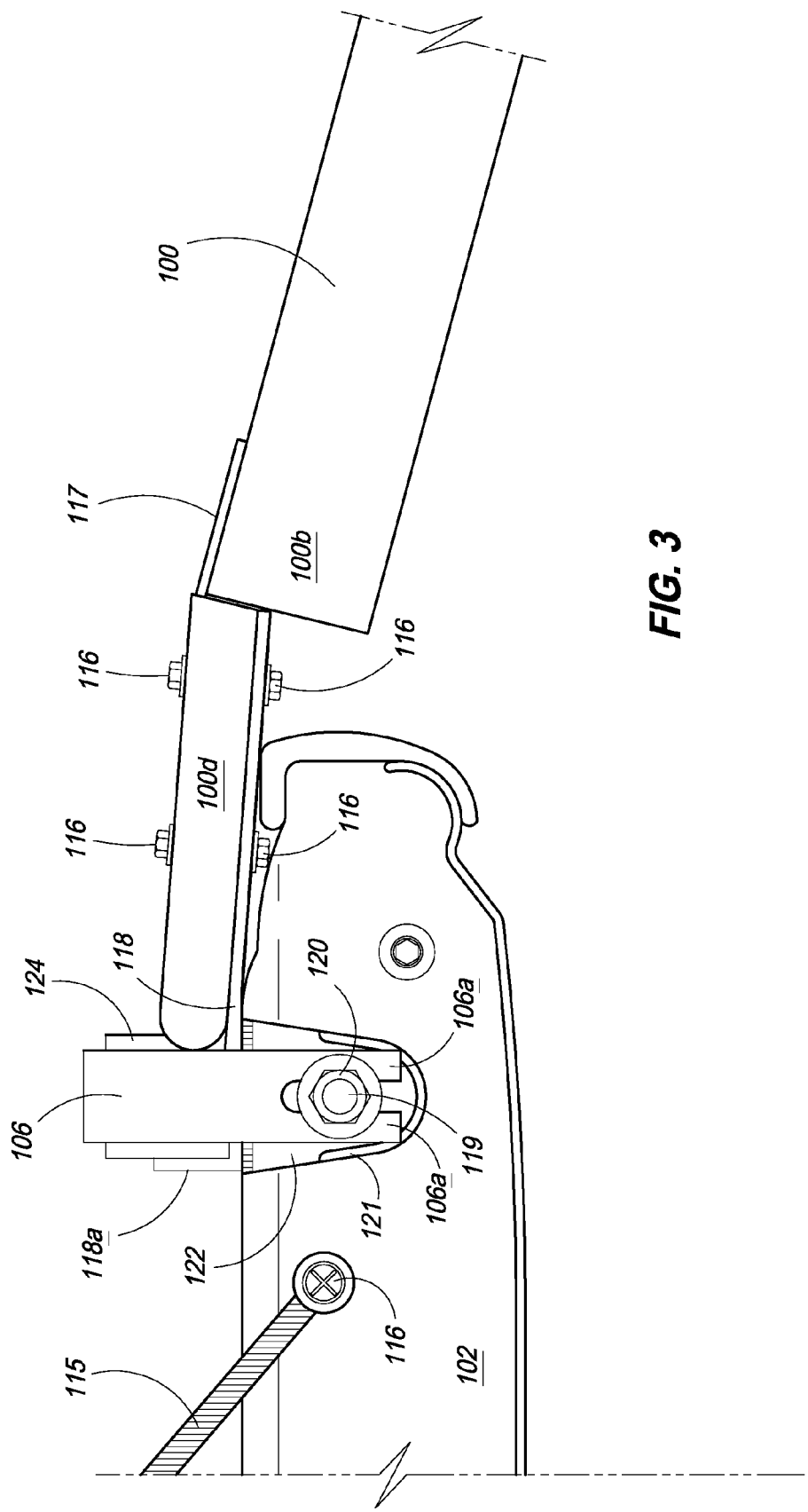
FIG. 3 is detail 3 from FIG. 1 illustrating a close-up elevation view of portions of the example of the embodiment shown in FIG. 1.

FIG. 3 is detail 3 from FIG. 1, illustrating a close-up elevation view of portions of the example of the embodiment shown in FIG. 1. The pickup tailgate 102 is in the down position with vehicle tailgate cable 115 attached to the tailgate 102 by fastener 116. The tailgate latch 121 is shown receiving and engaged with the embodiment of this invention shown in FIG. 3.

FIG. 3 illustrates ramp 100 with the upper or second end 100b of the ramp 100, vehicle tailgate 102, ramp engagement platform 100d, FIG. 3 illustrates securement bar structure 106, striker bolt threaded portion 119, striker bolt nut 120 and securement bar 124. As can be seen in FIG. 3, ramp engagement platform 100d includes a securement bar engagement tongue 118 which may be secured to ramp engagement platform 100d and which in this embodiment, extends under and around securement bar structure 106 (via the second end 118a of securement bar engagement tongue, with the first end of securement bar engagement tongue attached to the ramp 100 or ramp engagement platform 100d) to secure the ramp 100 to the securement bar 124 such that the ramp 100 cannot move away from the tailgate 102. Although bolts 116 are shown attaching securement bar engagement tongue to ramp engagement platform 100d, they may be attached to one another in any one of a number of different ways as will be appreciated by those of ordinary skill in the art, or they may be integral or one piece, depending on the application or embodiment of this invention.

In some embodiments of this invention, the ramp engagement platform 100d may be abutted against securement bar 124 and/or securement bar structure 106, to prevent or restrict the movement of ramp 100 toward the vehicle during loading, i.e. another point of securement of the ramp 100.

Figure 4:
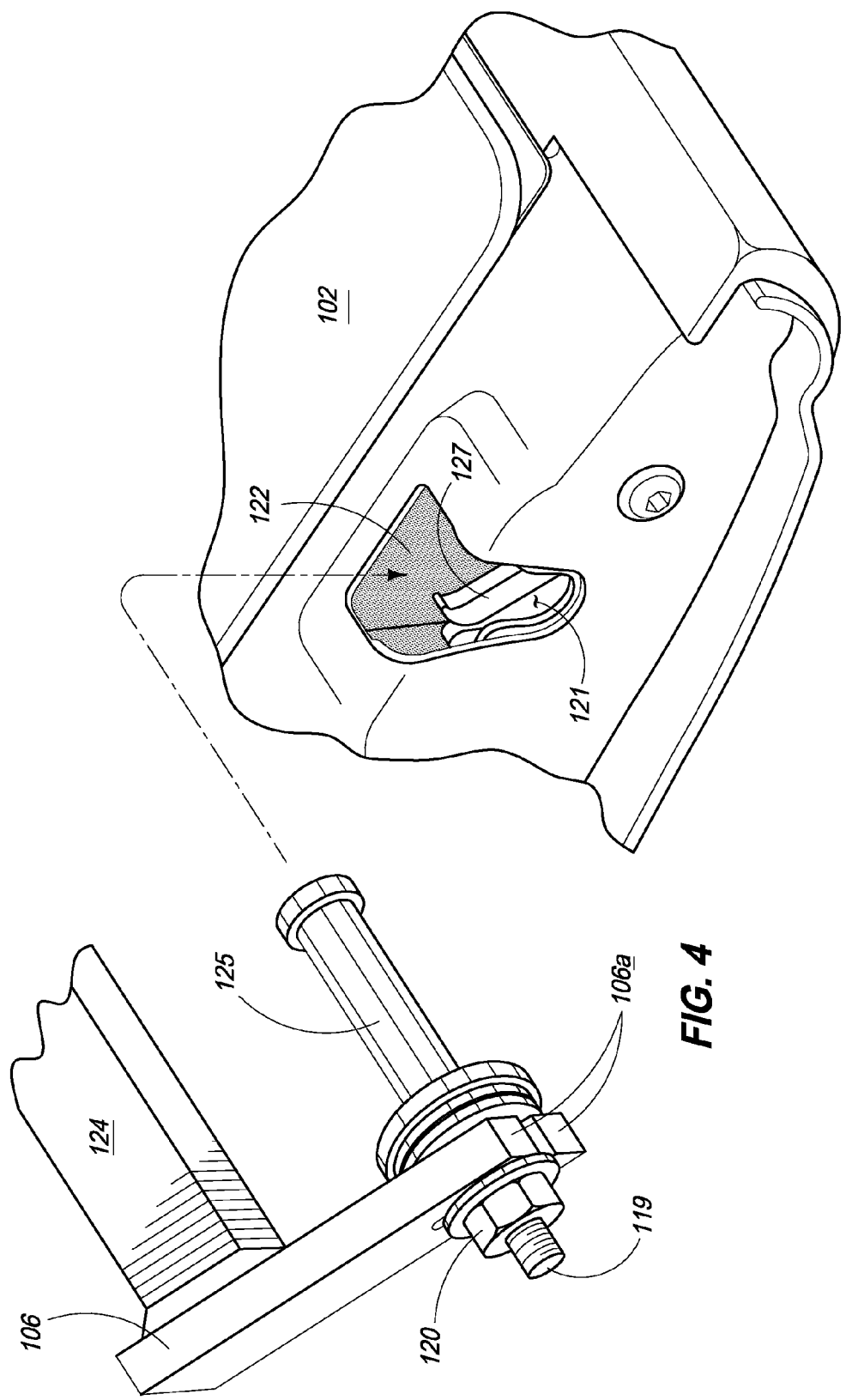
FIG. 4 is a perspective exploded view of one example of an embodiment of this invention illustrating how it may be inserted into a typical vehicle tailgate latch.

FIG. 4 is a perspective exploded view of one example of an embodiment of this invention illustrating how it may be inserted into a typical vehicle tailgate latch cavity 122 and latch 127 on a vehicle tailgate 102. FIG. 4 shows tailgate striker 125 attached to securement bar structure 106 of securement bar 124 via striker bolt threads 119 and striker nut 120. In this case, Securement bar structure 106 includes an attachment slot formed between spaced apart securement bar structure components 106a. As will be appreciated, in this example of the embodiment of the invention, striker bolt threaded portion 119 may be inserted through the attachment slot in securement bar structure 106 and secured thereon by tightening striker nut 120 on striker bolt threads 119, thereby securing it.

Figure 5:
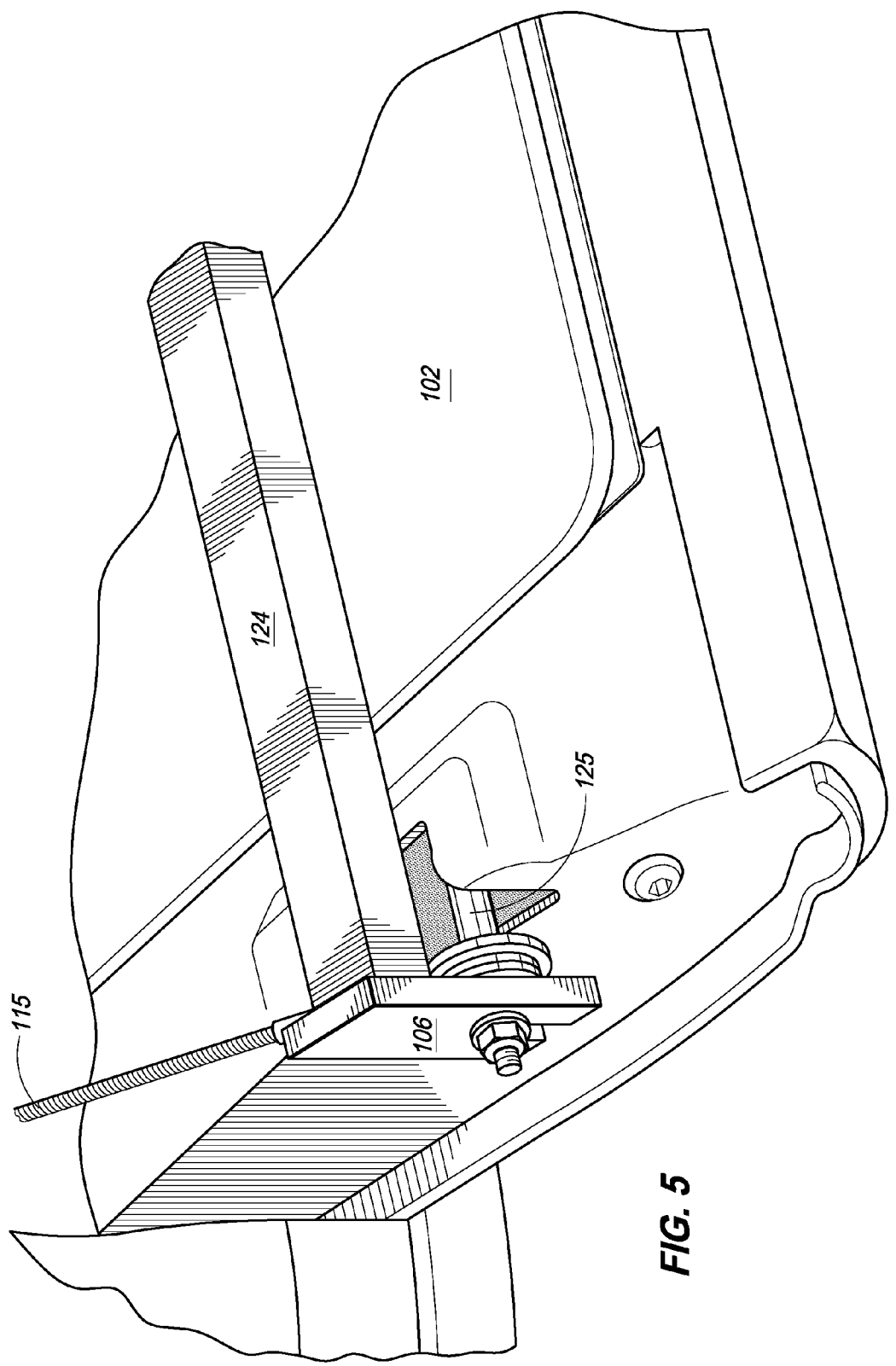
FIG. 5 is a perspective view of the example of the embodiment of this invention illustrated in FIG. 4 wherein it has been inserted into the latch tailgate of the vehicle.

FIG. 5 is a perspective view of the securement bar and striker bolt portion (without a ramp attached) of the example of the embodiment of this invention illustrated in FIG. 4 wherein the striker bolt 125 has been inserted into the latch of the tailgate 102 of a vehicle. FIG. 5 illustrates securement bar 124 positioned above the top surface of tailgate 102, tailgate cable 115, and securement bar structure 106 with striker bolt 125 attached thereto.

Figure 5A:
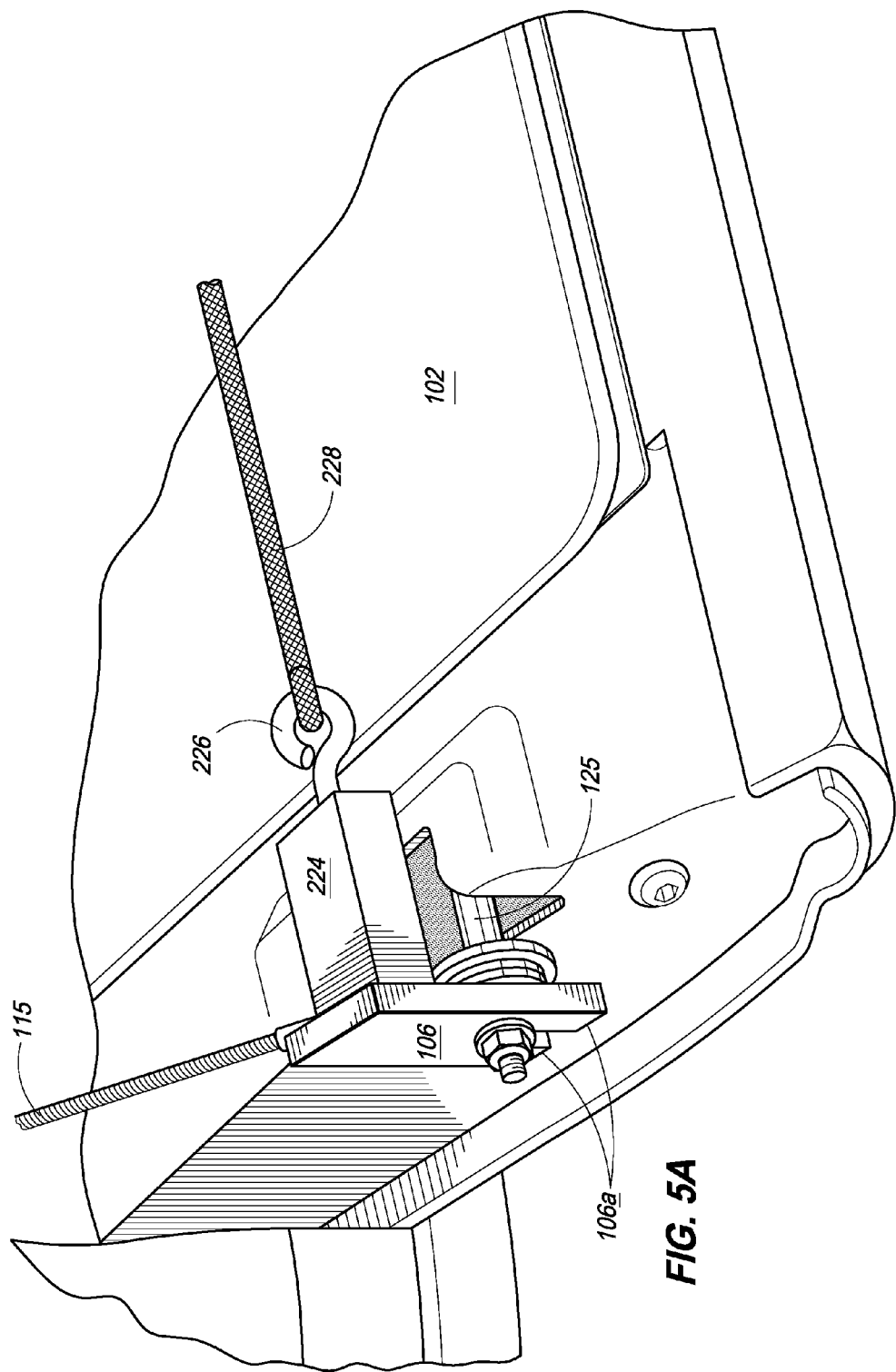
FIG. 5A is a perspective view of another example of an embodiment of this invention as shown in FIG. 5, only wherein a cable is utilized instead of a securement bar.

FIG. 5A is a perspective view of another example of an embodiment of this invention as shown in FIG. 5, only wherein a cable 228 is utilized instead of a rigid securement bar, which is also contemplated by some embodiments of this invention. It will be appreciated that while cable 228 is secured to securement bar 224 by eyelet 226, it may be secured to securement bar 224 in any one of a number of different ways all within the contemplation of embodiments of this invention. Although this is a partial view, the other end of cable 228 would be similarly attached to a securement bar on the opposite end of tailgate 102 which would be secured in the same or similar way as shown on this side of tailgate 102.

FIG. 6 is a perspective top view of one example of an embodiment of this invention and illustrating potential attachment tongues 132, 133, 134, 135, 136 & 137, which may be utilized to attach a ramp or other device to the securement bar 124 of this example of this embodiment of the invention. FIG. 6 illustrates first end 124a and second end 124b of securement bar 124 with striker bolts 125 & 129 attached to securement bar supports 106 & 130. Ramp attachment tongues 132, 133, 134, 135, 136 & 137 may without limitation be fastened to a ramp framework or component via bolts 138. It will be noted that the ramp attachment tongues 132, 133, 134, 135, 136 & 137 have ends or second ends 132a, 133a, 134a, 135a, 136a & 137a configured to extend beyond securement bar 124 and hook or create a point of securement or engagement on the opposing side to prevent the ramp to which the ramp attachment tongues 132, 133, 134, 135, 136 & 137 are attached from moving away from the vehicle.

FIG. 6A is a detail view of a portion of the example of the embodiment illustrated in FIG. 6, showing the first end 124a of securement bar 124, securement bar support 106, striker bolt 125 with threaded portion 119 of striker bar 125.

FIG. 7 is a top view of a portion of another example of an embodiment of this invention wherein the respective sides are independent and may be used alone or in combination with one another. FIG. 7 illustrates tailgate 102, first securement bar assembly 200 and second securement bar assembly 201, which for purposes of this description will have the same components though on opposite sides of the tailgate 102. FIG. 7 illustrates first securement bar assembly 200 and first ramp structure 202. The first securement bar assembly 200 includes securement bar 205 comprised of a first securement bar portion 205a attached to securement bar structure 206 (which in turn is attached to a striker bolt configured to insert into the tailgate latch—as shown in other Figures), and second securement bar portion 205b, which may be rigid or flexible (such as a strap). Second securement bar portion 205b is attached to first securement bar portion 205a and to the tailgate in two locations (by any one of a number of ways, such as hooking around the ends).

The securement bar configuration illustrated in FIG. 7 provides a three point attachment for the ramp, the first attachment point being the striker bolt secured within the tailgate latch, the second attachment point being the securing of the first end of the second portion of the securement bar 205 to the top of the tailgate (which prevents the movement of the ramp toward the truck), and the third attachment point being the securing of the end of the second securement bar portion to the bottom of the tailgate (which prevents the movement of the ramp away from the truck).

The three points of attachment provides a secure way of attaching one or more ramp structures to the tailgate.

Figure 8:
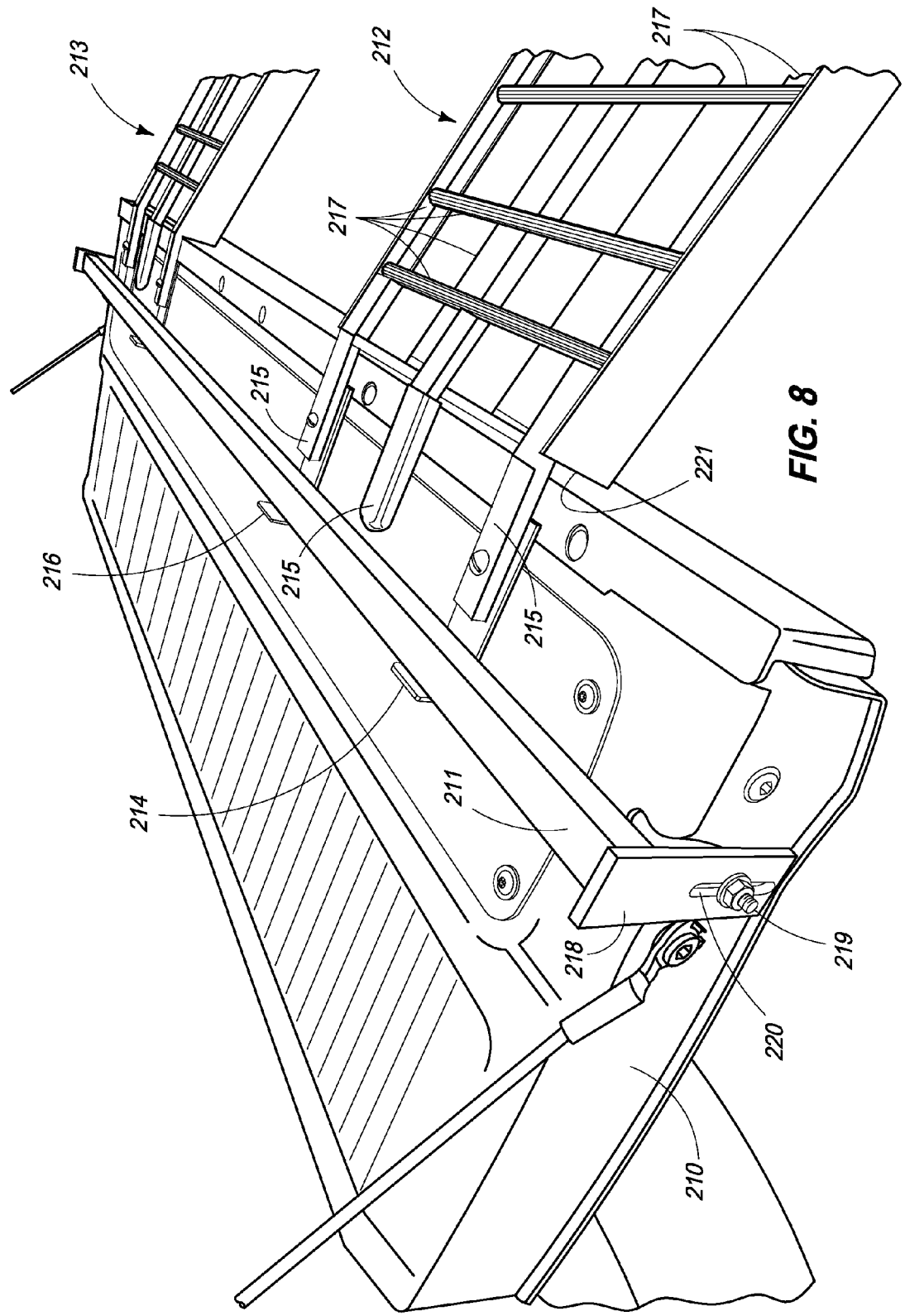
FIG. 8 is a perspective view of another example of an embodiment of the invention attached to the tailgate of a pickup truck.

FIG. 8 is a perspective view of another example of an embodiment of the invention attached to the tailgate 210 of a pickup truck. FIG. 8 illustrates a first ramp structure 212 and a second ramp structure 213 secured to a tailgate 210. Securement bar 211 is releasably attached to the tailgate 210 by striker bolts (only the threaded portion 219 of the striker bolt is visible in FIG. 8) within the tailgate latches in the vehicle tailgate. The first ramp structure 212 will be described and typically the second ramp structure 213 would be the same as the first ramp structure 212.

Although FIG. 8 shows each of the ramp structures with three support platforms 215, it will be appreciated by those of ordinary skill in the art that more or less may be utilized in any given embodiment and no specific number is required to practice this invention. In this embodiment the center support platform does not include a securement bar engagement tongue, but the two outer ones do have securement bar engagement tongues 214 which proceed under the securement bar 211 and then have a end portion that abuts against the opposite side of the securement bar 211. This end portion of the securement bar engagement tongues 214 may be bent steel or other metal and preferably abut the securement bar 211 to prevent the first ramp structure 212 from moving away from the vehicle.

It should also be noted that it is preferred to have another point of engagement or securement and that is at the abutment location 221 where the first ramp structure 212 abuts against the end of the tailgate 210. This abutment prevents the first ramp structure 212 from moving toward the vehicle, giving the assembly for the first ramp structure three points of engagement or securement, namely the striker bolt within the tailgate latch, the end portion of the securement bar engagement tongue 214 against the far side of the securement bar 211 and the abutment of the first ramp structure 212 against the near end of the tailgate 210.

Figure 9:
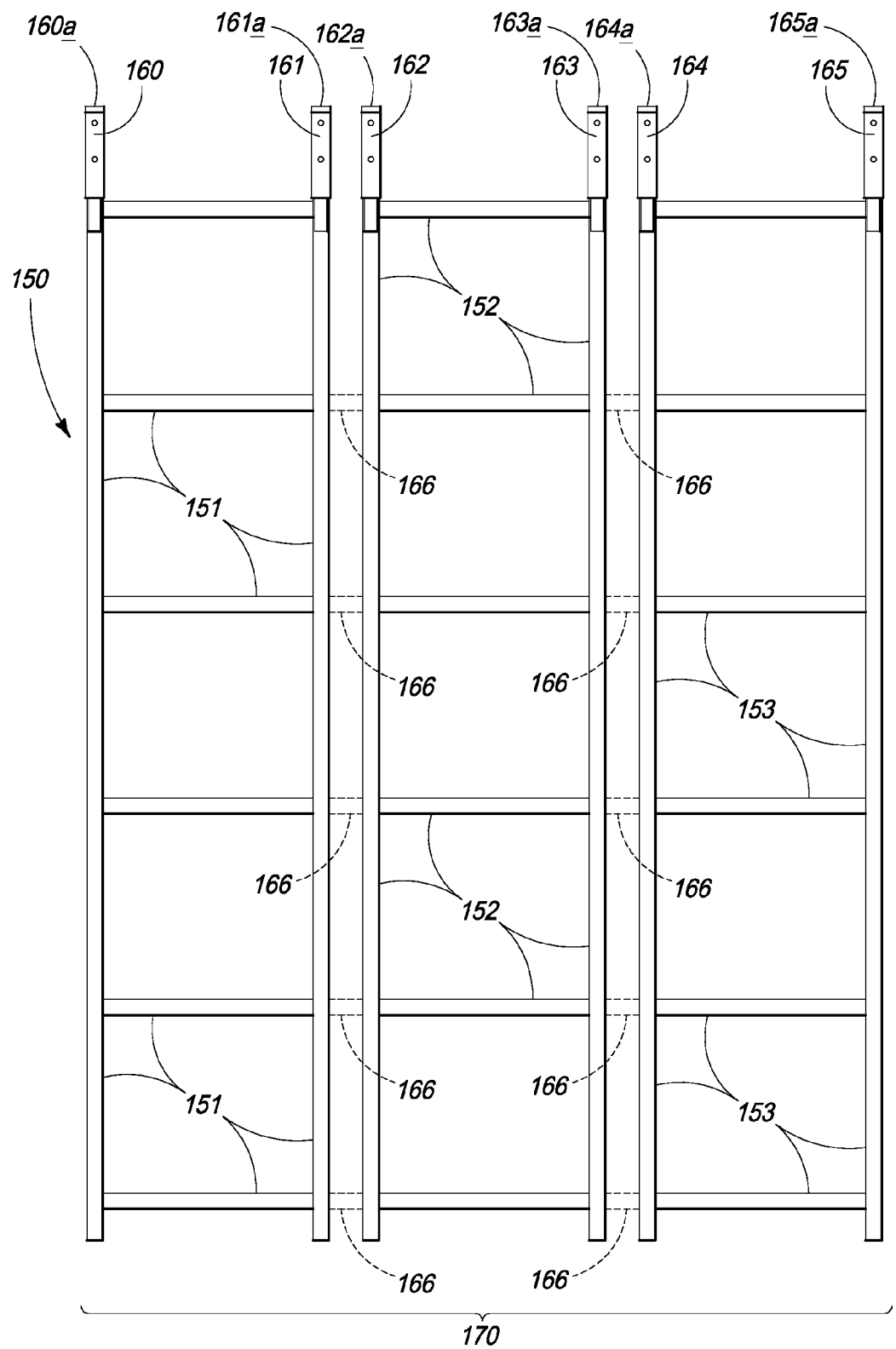
FIG. 9 is a top view of an exemplary ramp which may be utilized in combination with embodiments of this invention to load and unload items such as ATVs and snowmobiles into the back of a vehicle.

FIG. 9 is a top view of an exemplary ramp 150 which may be utilized in combination with embodiments of this invention to load and unload items such as ATVs and snowmobiles into the back of a vehicle. FIG. 9 illustrates a ramp 150 which includes three generally separate framework structures which may be independently secured to a tailgate, or which may be interconnected to the adjacent structure and function more as one unified or integral structure of a general width 170. FIG. 9 illustrates ramp 150 with a first support framework 151 with tailgate platforms 160 and 161, a second support framework 152 with tailgate platforms 162 and 163, and a third support framework 153 with tailgate platforms 164 and 165. The tailgate platforms 160, 161, 162, 163, 164, and 165 may also act as tongues that are attached at first ends to the ramp framework and extend sufficiently at a second end such that they may be extended beyond a securement bar and hook up and around the securement bar or securement bar at second ends 160a, 161a, 162a, 163a, 164a, and 165a to prevent the ramp from moving away from the vehicle.

FIG. 9 further shows possible interconnection structures 166 to secure or interconnect the three framework structures to operate integrally or provide additional structural support for the framework.

Figure 10:
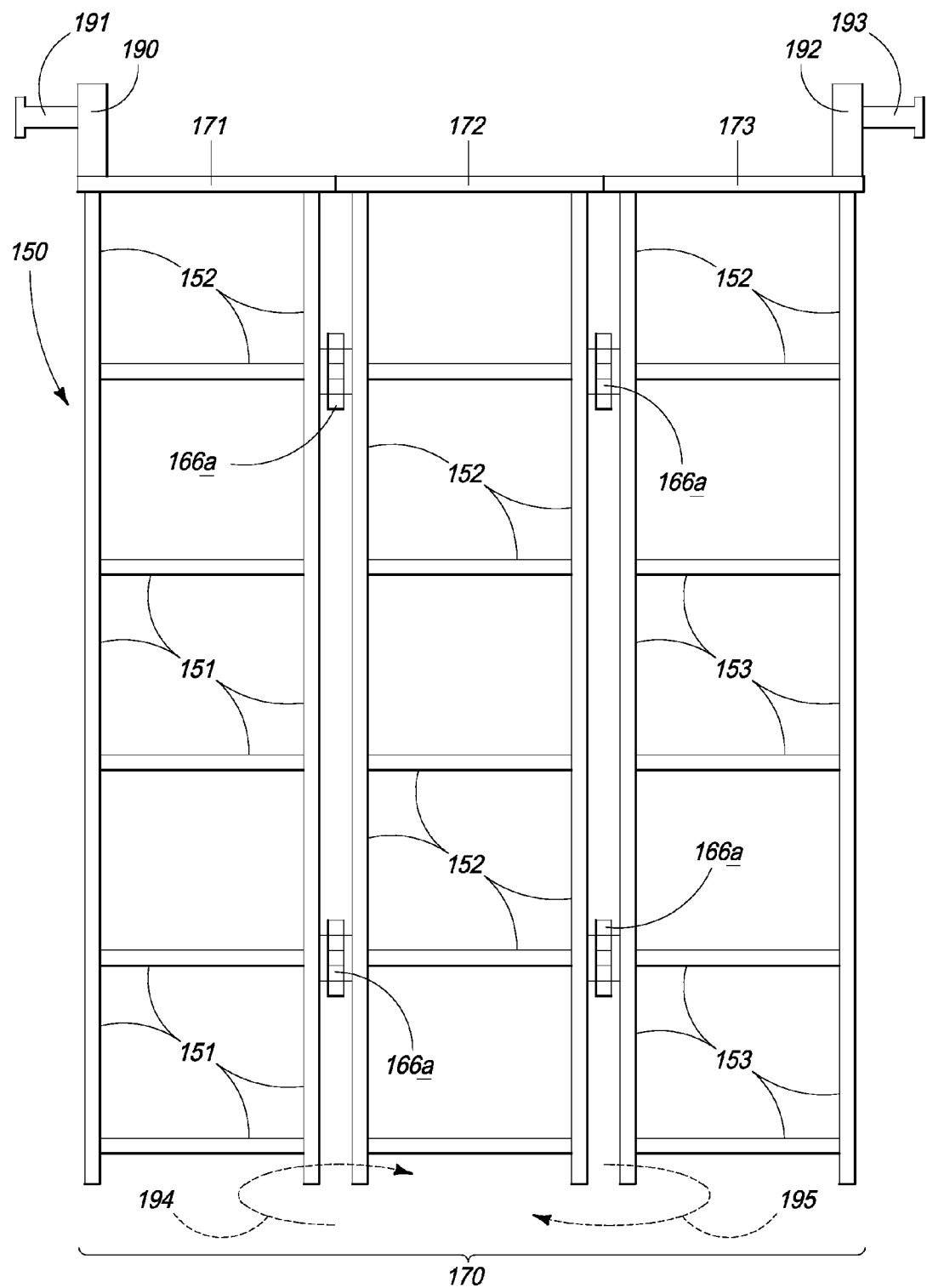
FIG. 10 is a top view of an exemplary ramp which may be utilized in combination with embodiments of this invention to load and unload items such as ATVs and snowmobiles into the back of a vehicle.

FIG. 10 is a top view of an exemplary ramp 150 which may be utilized in combination with embodiments of this invention to load and unload items such as ATVs and snowmobiles into the back of a vehicle. FIG. 10 illustrates an embodiment wherein the ramp framework itself creates the structure between the two points of attachment of the respective striker bolts in the tailgate latches. FIG. 10 may for example be used with the split securement bar configuration, one embodiment of which is illustrated in FIG. 7.

In FIG. 10 the ramp 150 has the same general components as shown in FIG. 9, only the three ramp portions 171, 172 and 173, are interconnected by hinges 166a such that when the three ramp components are in the open configuration shown in FIG. 10 they provide a ramp platform with an integral framework with striker bolt structures 190 and 192 with striker bolts 191 and 193. In this example of this embodiment of the invention, the two outer ramp portions 171 and 173 are pivotally attached to center ramp portion 172 such that they can be rotated relative to the center ramp portion 172 as shown by arrows 194 and 195. In this way the ramp can be stored in the space or width of about one of the ramp portions but then expanded to the position shown for attachment or securement to the tailgate of the vehicle via striker bolts 191 and 193. In this embodiment, a separate securement bar is not necessarily required to practice the invention. FIG. 10 includes like numbers for like components described in FIG. 9.

Figure 11:
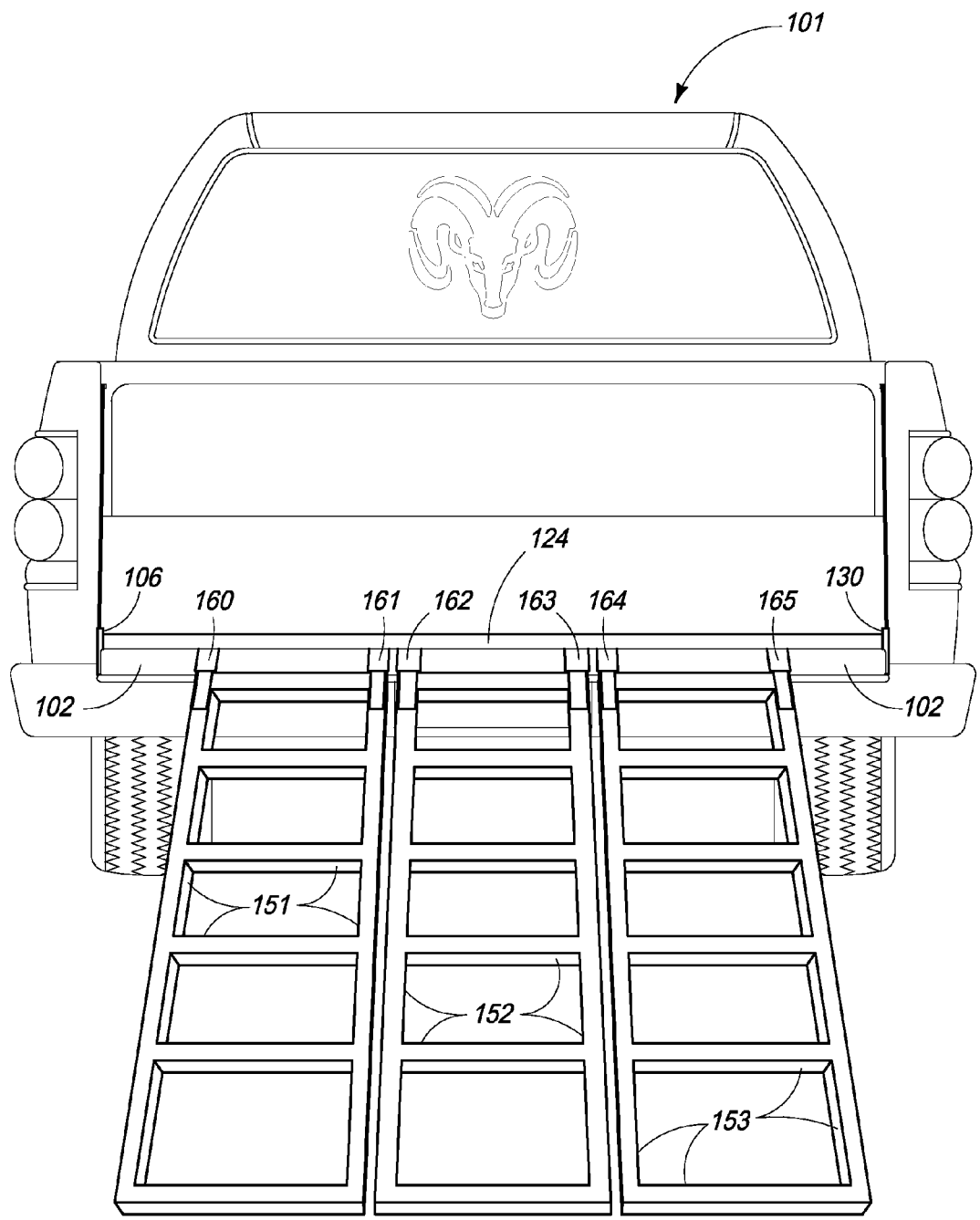
FIG. 11 is a rear view of an example of the embodiment of this invention shown in FIG. 2 attached to the tailgate of a pickup truck.

FIG. 11 is a rear view of an example of an embodiment of this invention shown in FIG. 9 attached to the tailgate 102 of a pickup truck 101. FIG. 11 shows vehicle or pickup truck 101, securement bar 124 secured to pickup tailgate 102 (as illustrated in other Figures), first support framework 151 with tailgate platforms 160 and 161, second support framework 152 with tailgate platforms 162 and 163, and third support framework 153 with tailgate platforms 164 and 165. Securement bar or securement bar structure 106 is also shown in FIG. 11, though described more fully above as shown in other Figures. FIG. 11 shows the three support frameworks independent from one another and separately engaging the securement bar 124.

Figure 12:
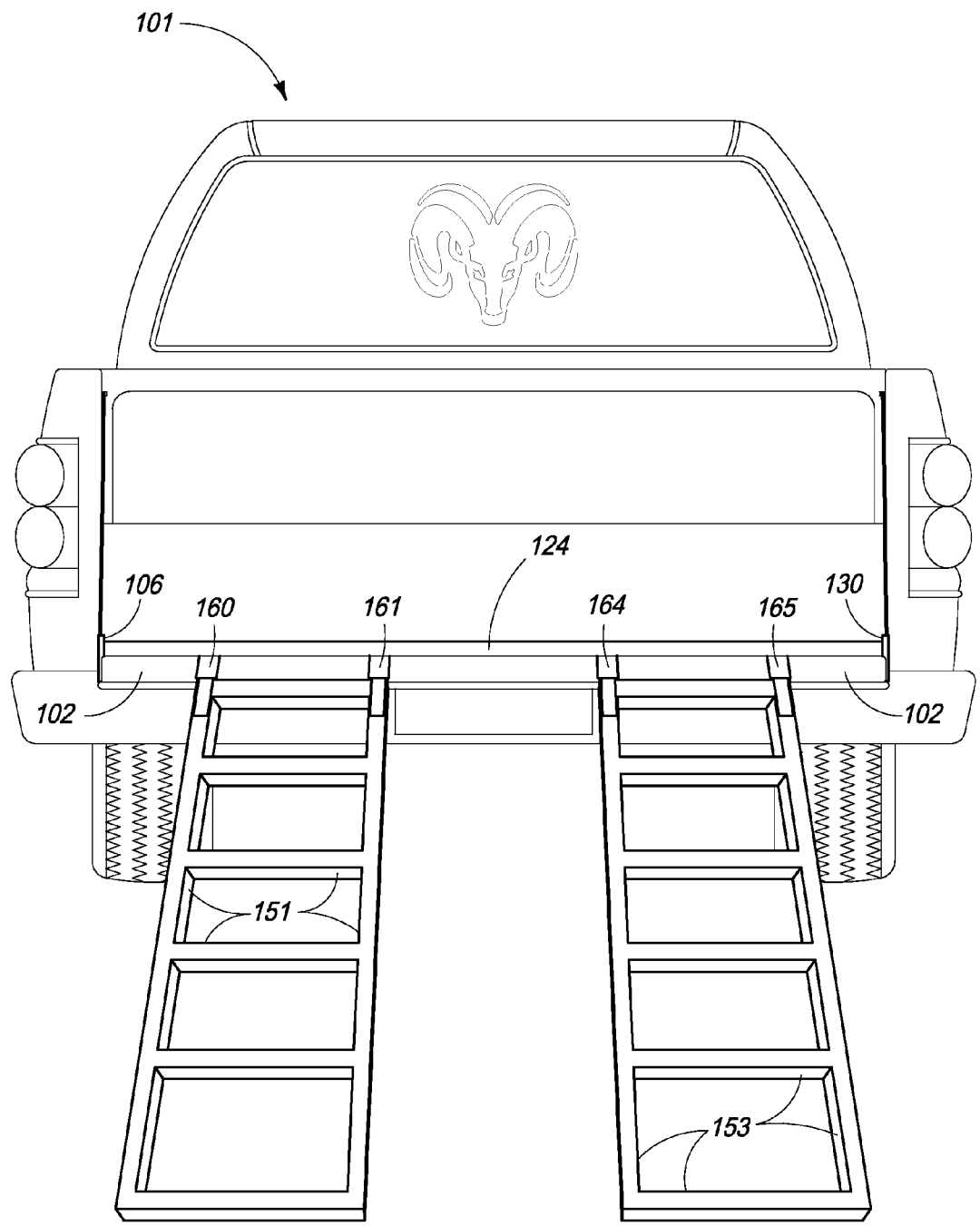
FIG. 12 is a rear view of an example of the embodiment of this invention shown in FIG. 1 attached to the tailgate of a pickup truck.

FIG. 12 is a rear view of an example of an embodiment of this invention, shown attached to the tailgate 102 of a pickup truck 101. FIG. 12 shows vehicle or pickup truck 101, securement bar 124 secured to pickup tailgate 102 (as illustrated in other Figures), first support framework 151 with tailgate platforms 160 and 161, and third support framework 153 with tailgate platforms 164 and 165. Securement bar or securement bar structure 106 is also shown in FIG. 12, though described more fully above as shown in other Figures. FIG. 12 shows the two support frameworks independent from one another and separately engaging the securement bar 124.

As will be appreciated by those of reasonable skill in the art, there are numerous embodiments to this invention, and variations of elements, components and combinations, which may be used, all within the scope of this invention.

It should further be appreciated that the securement bar or securement bar framework (in the continuous securement bar embodiment as this would not apply to the split securement bar embodiment) may be expandable or contractable (by telescoping or other mechanisms) to fit differently sized tailgates, all within the contemplation of this invention. One embodiment of this invention, for example, is a vehicle attachment apparatus for securing an item to a tailgate of a vehicle, comprising: a tailgate striker bolt configured attach to and detach from a tailgate latch of the vehicle; and a securement bar attached at a first end to the first tailgate striker bolt and attached at a second end to the second tailgate striker bolt, the rigid securement bar sized and configured such that the first tailgate striker bolt and the second tailgate striker bolt may be simultaneously attached respectively to the first tailgate latch and the second tailgate latch of the tailgate of a vehicle.

Another embodiment of the invention may include a vehicle attachment apparatus for securing an item to a tailgate of a vehicle, comprising: a first tailgate striker bolt configured attach to and detach from a first tailgate latch of the vehicle and a second tailgate striker bolt configured attach to and detach from a second tailgate latch of the vehicle; and a securement bar attached at a first end to the first tailgate striker bolt and attached at a second end to the second tailgate striker bolt, the securement bar sized and configured such that the first tailgate striker bolt and the second tailgate striker bolt may be simultaneously attached respectively to the first tailgate latch and the second tailgate latch of the tailgate of a vehicle.

Yet another embodiment of this invention may include a vehicle ramp assembly for secure attachment to a tailgate of a vehicle, comprising: a vehicle attachment apparatus for securing an item to a tailgate of a vehicle, comprising: a first tailgate striker bolt configured attach to and detach from a first tailgate latch of the vehicle and a second tailgate striker bolt configured attach to and detach from a second tailgate latch of the vehicle; and a securement bar attached at a first end to the first tailgate striker bolt and attached at a second end to the second tailgate striker bolt, the securement bar sized and configured such that the first tailgate striker bolt and the second tailgate striker bolt may be simultaneously attached respectively to the first tailgate latch and the second tailgate latch of the tailgate of a vehicle; a ramp configured at a first end to rest on a surface and configured at a second end to attach to the securement bar. The preceding example may further include wherein the ramp is further configured at the second end to attach and detach to the securement bar.

A ramp for secure attachment and detachment to a tailgate of a vehicle, the ramp comprising: a ramp framework configured to provide a support surface for moving items from outside of the vehicle to a support surface of the vehicle, the ramp further comprising: a first tailgate striker bolt and a second tailgate striker bolt configured respectively to attachably and detachably fit within a first tailgate latch and a second tailgate latch on the tailgate of the vehicle; and the ramp framework providing a rigid middle portion which is attached at a first end to the first tailgate striker bolt and attached at a second end to the second tailgate striker bolt, the ramp framework combined with the first tailgate striker bolt and the second tailgate striker bolt being sized and configured in combination such that the first tailgate striker bolt and the second tailgate striker bolt may be simultaneously attached to the first tailgate latch and the second tailgate latch of the tailgate of the vehicle.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A vehicle attachment apparatus for securing an item to a tailgate of a vehicle, comprising:
   a tailgate striker bolt configured to attach to and detach from a tailgate latch of the vehicle;

a securement bar attached at a first end to the first tailgate striker bolt and attached at a second end to the second tailgate striker bolt, the rigid securement bar sized and configured such that the first tailgate striker bolt and the second tailgate striker bolt may be simultaneously attached respectively to the first tailgate latch and the second tailgate latch of the tailgate of a vehicle;

a ramp comprised of a first end and a second end, the first end being configured to be supported by a ground surface, the second end including an integral ramp tongue attached at a first end to the ramp and configured to be supported directly by the tailgate of the vehicle in its lowered position, and the ramp tongue further including an upwardly projecting second end; and wherein the securement bar is configured for simultaneous securement to the first and second tailgate latches while being further disposed to engage the upwardly projecting second end of the ramp tongue to secure the ramp to the tailgate of the vehicle in its lowered position.

2. A vehicle attachment apparatus for securing an item to a tailgate of a vehicle, comprising:

a first tailgate striker bolt configured to attach to and detach from a first tailgate latch of the vehicle and a second tailgate striker bolt configured to attach to and detach from a second tailgate latch of the vehicle; and a securement bar attached at a first end to the first tailgate striker bolt and attached at a second end to the second tailgate striker bolt, the securement bar sized and configured such that the first tailgate striker bolt and the second tailgate striker bolt may be simultaneously attached respectively to the first tailgate latch and the second tailgate latch of the tailgate of a vehicle;

a ramp comprised of a first end and a second end, the first end being configured to be supported by a ground surface, the second end including an integral ramp tongue attached at a first end to the ramp and configured to be supported directly by the tailgate of the vehicle in its lowered position, and the ramp tongue further including an upwardly projecting second end; and wherein the securement bar is configured for simultaneous securement to the first and second tailgate latches while being further disposed to engage the upwardly projecting second end of the ramp tongue to secure the ramp to the tailgate of the vehicle in its lowered position.

3. A vehicle ramp assembly for secure attachment to a tailgate of a vehicle, comprising:

a vehicle attachment apparatus for securing an item to a tailgate of a vehicle, comprising:

a first tailgate striker bolt configured to attach to and detach from a first tailgate latch of the vehicle and a second tailgate striker bolt configured to attach to and detach from a second tailgate latch of the vehicle; and a securement bar attached at a first end to the first tailgate striker bolt and attached at a second end to the second tailgate striker bolt, the securement bar sized and configured such that the first tailgate striker bolt and the second tailgate striker bolt may be simultaneously attached respectively to the first tailgate latch and the second tailgate latch of the tailgate of a vehicle;

a ramp comprised of a first end and a second end, the first end being configured to be supported on a ground surface, the second end including an integral ramp tongue attached at a first end to the ramp and configured to be supported directly by the tailgate of the vehicle in its lowered position, and the ramp tongue further including an upwardly projecting second end; and wherein the securement bar is configured for simultaneous securement to the first and second tailgate latches while being further disposed to engage the upwardly projecting second end of the ramp tongue to secure the ramp to the tailgate of the vehicle in its lowered position.

4. A vehicle ramp assembly for secure attachment to a tailgate of a vehicle as recited in claim 3, and wherein the ramp is further configured at the second end to attach and detach to the securement bar.

5. A ramp for secure attachment and detachment to and directly upon a tailgate of a vehicle, the ramp comprising:

a ramp framework configured to provide a support surface for moving items from outside of the vehicle to a support surface of the vehicle, the ramp including a first end and a second end, the first end being configured to be supported by a ground surface, and further comprising at the second end:

a first tailgate striker bolt and a second tailgate striker bolt configured respectively to attachably and detachably fit within a first tailgate latch and a second tailgate latch on the tailgate of the vehicle; and the ramp framework providing a rigid middle portion which is attached at a first end to the first tailgate striker bolt and attached at a second end to the second tailgate striker bolt, the ramp framework combined with the first tailgate striker bolt and the second tailgate striker bolt being sized and configured in combination such that the first tailgate striker bolt and the second tailgate striker bolt may be simultaneously attached to the first tailgate latch and the second tailgate latch of the tailgate of the vehicle and a portion of the ramp framework is positioned directly above the first and second tailgate latches when the tailgate is in its lowered position.

* * * * *